United States Patent
Schmid et al.

(10) Patent No.: US 6,672,159 B2
(45) Date of Patent: Jan. 6, 2004

(54) METHOD FOR ADJUSTING THE PHASE-LOCKING LOOP OF AN ELECTRONIC EVALUATION DEVICE AND CORRESPONDING ELECTRONIC EVALUATION DEVICE

(75) Inventors: Frank Schmid, Roemerstein (DE); Jens Mohaupt, Pliezhausen (DE); Wolfram Bauer, Tuebingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/203,861
(22) PCT Filed: Dec. 4, 2001
(86) PCT No.: PCT/DE01/04561
§ 371 (c)(1), (2), (4) Date: Nov. 12, 2002
(87) PCT Pub. No.: WO02/48649
PCT Pub. Date: Jun. 20, 2002

(65) Prior Publication Data
US 2003/0121307 A1 Jul. 3, 2003

(30) Foreign Application Priority Data
Dec. 14, 2000 (DE) .......................... 100 62 347

(51) Int. Cl.$^7$ .............................. G01C 19/00
(52) U.S. Cl. .................. 73/504.12; 310/319
(58) Field of Search ............ 73/504.02, 504.03, 73/504.04, 504.12; 310/316.1, 319

(56) References Cited

U.S. PATENT DOCUMENTS

| | | | |
|---|---|---|---|
| 5,287,033 A | * | 2/1994 | Morton .................. 310/316.1 |
| 5,379,223 A | | 1/1995 | Asplund |
| 5,600,064 A | | 2/1997 | Ward |
| 5,850,035 A | | 12/1998 | Hilby et al. |
| 6,067,858 A | | 5/2000 | Juneau et al. |

\* cited by examiner

Primary Examiner—Richard A. Moller
(74) Attorney, Agent, or Firm—Kenyon & Kenyon

(57) ABSTRACT

A method is described for balancing the phase-locked loop of an electronic analyzing device which analyzes the output signal of a sensor device, a yaw rate sensor in particular using the Coriolis effect having an oscillating mass which undergoes a deflection under the effect of an external yaw rate on the sensor device and the output signal representing a yaw rate signal, the electronic analyzing device having in addition to the phase-locked loop, a control loop, a quadrature control loop in particular, and the control loop is provided with a controller having an input and an output as well as with a modulator or mixer having an input which has a first electrical connection with the output of the controller. In order to reduce the percentage of sensor devices produced which, however, cannot be balanced the first electrical connection is interrupted between the output of the controller and the input of the mixer and a second electrical connection is produced between the output of the controller and the input of the mixer, the second electrical connection being made by connecting an attenuating element in between.

14 Claims, 6 Drawing Sheets

METHOD FOR ADJUSTING THE PHASE-LOCKING LOOP OF AN ELECTRONIC EVALUATION DEVICE AND CORRESPONDING ELECTRONIC EVALUATION DEVICE

FIELD OF THE INVENTION

The present invention relates to a method for balancing the phase-locked loop of an electronic analyzing device and an electronic analyzing device.

BACKGROUND OF THE INVENTION

Yaw rate sensors that utilize the Coriolis effect (so-called Coriolis vibratory gyros or abbreviated: CVGs) have an oscillating mass (sensor element) and an electronic analyzing circuit by which the deflection of the oscillating mass is determined based on the effect of an external yaw rate on the sensor. The electronic analyzing circuit is typically provided with a phase-locked loop (PLL) to obtain information concerning the phase position of path-proportional and velocity-proportional signals. Furthermore, the PLL synchronizes the signal processing with the sensor drive frequency.

The following is true of the Coriolis force $F_C$:

$$F_C = 2 \ast m \ast (v \times \Omega)$$

where:

m: mass of the structure moved v: velocity of the structure moved $\Omega$: external yaw rate The Coriolis force $F_C$ causes a deflection $\Delta x$ in a CVG. The mechanical transfer function $x/F$ of the CVG then causes this deflection $\Delta x$ to undergo a phase shift $\alpha$ when the quality of the mechanical system is not sufficiently high and the frequency difference between the working frequency and the resonance frequency of the detection mode is low.

To be able to measure a yaw rate, this signal is demodulated with an in-phase, velocity-proportional signal v_prop. CVGs exhibit interference signals that are not proportional to the velocity. Rather, these interference signals are in phase with the path and they may possibly be much greater than the actual yaw rate signal RATE to be measured. The demodulation signal v_prop, which is obtained from the PLL, is therefore also phase-shifted by $\alpha$ in order to determine the yaw rate precisely and in order not to have components of interference signal QUAD in the output signal.

In order to balance the PLL at the band end, demodulation takes place in the signal path according to QUAD (x_prop), the external yaw rate is applied and the phase is changed until it is no longer possible to observe an effect on the signal output by the yaw rate. FIG. 1 shows schematically the circuitry of an implementation of this method.

This method may be applied if the quadrature signals are so small that they do not overmodulate the signal path. However, if the interference signals are greater than the useful signal by several orders of magnitude, then a quadrature control loop is provided. This is implemented as an extension of the illustration of FIG. 1 in FIG. 2 to illustrate the related art.

The previously described balancing method now fails since when a yaw rate is applied and the PLL is incorrectly balanced, the quadrature control loop suppresses the quadrature demodulated yaw rate signal at the signal output, i.e., the criterion for balancing the PLL is lacking. Rather, the signal at the quadrature controller output is used here as a balancing criterion. Very small $V/°(\alpha)$ signals are produced at the output of the quadrature controller which become even smaller if the capture range of the controller is large. It is not possible to avoid these problems by strengthening the output of controller output signal UI (see FIG. 2; FIG. 4) since the supply voltage available is usually limited and amounts to 5V, for example. The signal for suppressing the quadrature is often substantially greater than the signal produced by applying a yaw rate. Amplified signal UI would therefore reach the limits of the possible modulation range.

SUMMARY OF THE INVENTION

The object of the present invention is to provide a method for balancing the phase-locked loop of an electronic analyzing device, which analyzes the output signal of a sensor device such as a yaw rate sensor utilizing the Coriolis effect in particular, as well as to provide an electronic analyzing device, the method and the analyzing device making it possible for the phase-locked loop of the electronic analyzing device to balance the phase-locked loop of the electronic analyzing device with a clearly higher percentage rate of assigned sensor devices.

As already explained above, in order to suppress deflection-proportional interference signals, a quadrature control loop is used in the analyzing device to analyze the output signal of a sensor device.

An important aspect of the present invention is that the quadrature control loop is expanded so that the output signal of the controller of the quadrature control loop delivers a higher output voltage during the balancing of the phase-locked loop than during normal control operation. The output signal delivered is a function of the amplitude of the external yaw rate acting on the sensor device and phase angle a set in the PLL. It is thus possible to dimension the capture range of the quadrature control loop for normal control operation in such a way that even sensor devices having large interference amplitudes may be used. This would not be possible without the change in the control loop according to the present invention since the two requirements are contradictory.

As explained, an electronic analyzing device is assigned to each sensor device, the phase-locked loop of each analyzing device being balanced to the specific sensor. Since the electronic analyzing device of the present invention and the method of the present invention for balancing the phase-locked loop allows the possibility for even balancing sensor devices, the output signals of which have a higher interference signal, it is possible to significantly reduce the reject rate of non-balanceable sensor devices and accordingly the production costs.

Furthermore, it is an advantage that the method of the present invention to balance the phase-locked loop can be completely automated with very little expense for circuitry and is thus suitable for mass production.

BRIEF DESCRIPTION OF THE DRAWINGS

FIG. 5 shows the known yaw rate sensor in detail and the analyzing circuit according to the present invention according to FIG. 3a.

DETAILED DESCRIPTION

A CVG has a drive loop which is used to cause a seismic mass to vibrate. An electric, path-proportional signal x picked off in the drive loop is used as an input signal for a PLL. Depending on the drive concept, a velocity-proportional signal v may also be processed. The drive loop is not shown as part of the description of the present invention since the present invention refers to the processing of the output signals of a CVG.

Figure 1:
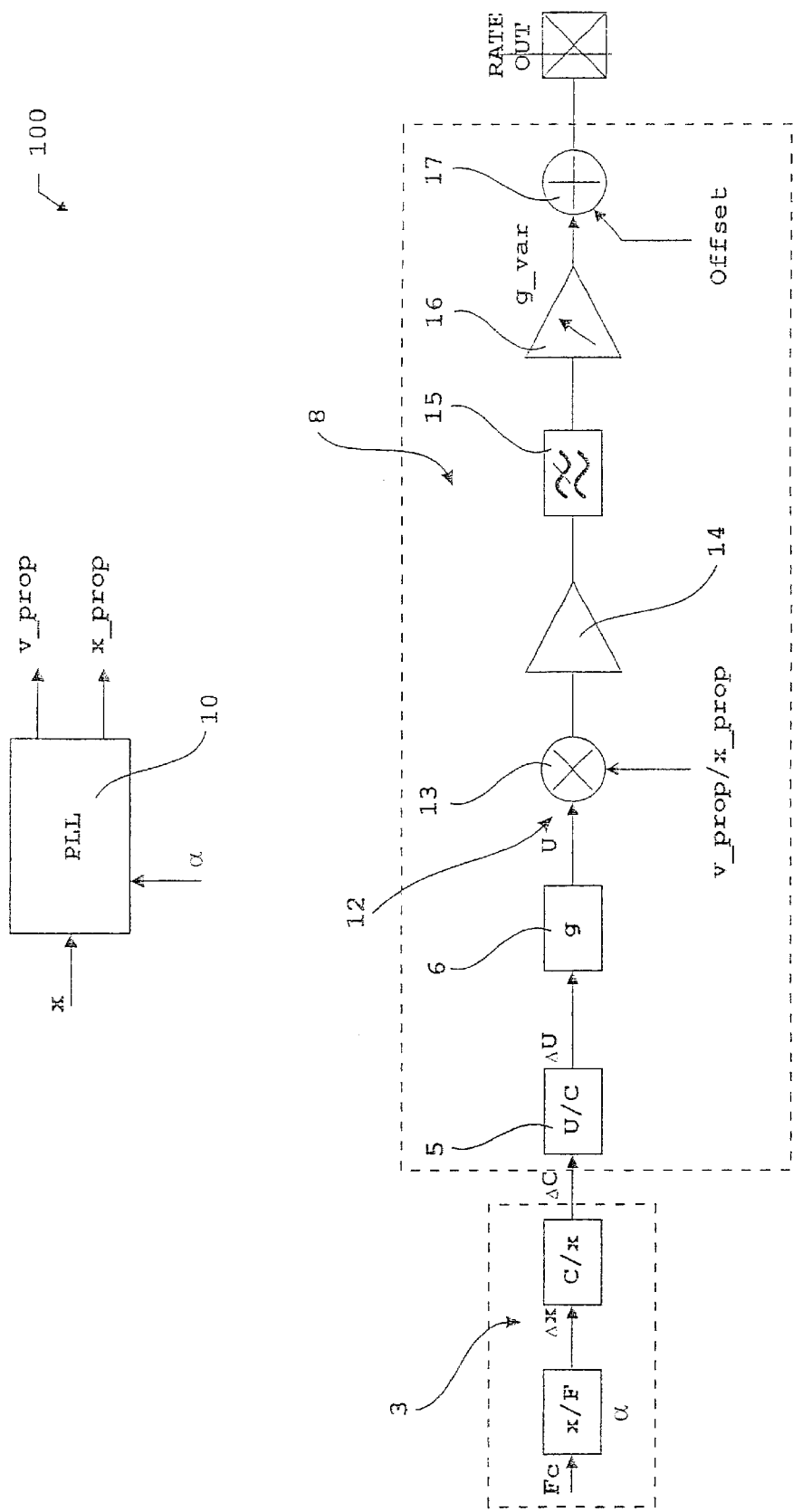
FIG. 1 shows a known analyzing device and analyzing circuit for the known yaw rate sensor which is shown in a highly schematic form.

FIG. 1 shows a combination 100 of a known yaw rate sensor 3 which is shown in a highly schematic form and a known analyzing device or analyzing circuit 8, the analyzing device determining the yaw rate RATE OUT from the output signal of the sensor device, i.e., of the yaw rate sensor, i.e., of CVG 3. The yaw rate-proportional Coriolis force $F_C$ causes a deflection $\Delta x$ on the oscillating mass, the deflection undergoing a phase shift $\alpha$ in relation to Coriolis force $F_C$ because of the mechanical transfer function x/F of CVG 3 in question. After passing through a C/U converter 5, the output signal of the CVG is present as a voltage signal and after passing through an intermediate amplifier 6 having a gain factor g, it is further processed as voltage U in analyzing device 8. To be able to measure a yaw rate RATE, signal U is demodulated with an in-phase, velocity-proportional signal. Rectangular signals x_prop and v_prop used for this purpose are provided separately by a phase-locked loop or PLL 10 from input signals x and $\alpha$. x_prop is in phase with signal x. v_prop is phase-shifted by 90° in relation to signal x. The signals are used for in-phase synchronous demodulation. As a rule, a CVG exhibits interference signals QUAD that are not proportional to velocity but rather are proportional to and in phase with the path. In addition, the interference signals may possibly be very much greater than RATE OUT, the yaw rate signal to be actually measured. Demodulation signal v_prop, which is obtained from PLL 10, is therefore also phase shifted by $\alpha$ in order to determine yaw rate RATE OUT precisely and to prevent components of the quadrature signal, i.e., interference signal QUAD in the output signal. To determine $\alpha$, input signal U of analyzing unit 8 is demodulated in a signal path 12 according to QUAD (x_prop) by supplying it in succession to a mixer or multiplier 13, an amplifier 14, a low-pass filter 15 and an amplifier 16 having adjustable gain g_var. Offset balancing takes place at a summer 17 so that quadrature signal QUAD may be picked off as a signal at an output OUT.

To adjust or balance the device shown, amplified yaw rate signal U of angular sensor 3 is applied at described signal path 12 and phase angle $\alpha$ is changed until no effect by the yaw rate can be observed at the signal output. However, this method can only be used if quadrature signals QUAD are so small that they do not overmodulate signal path 12. If, however, interference signals QUAD are larger by several orders of magnitude tha yaw rate signal RATE OUT which is contained and is isolated, then a quadrature control loop 20 is provided. This has been done as an extension of the illustration of FIG. 1 in the circuit of FIG. 2. Quadrature control loop 20 includes a first mixer 21 in which signal U amplified by a factor g by amplifier 6 is mixed with x_prop to form output signal UI after passage through a controller 22. UI is mixed with auxiliary signal x_prop provided by PLL 10 once more in a second mixer 23 and is then sent in inverted form to a summer 25 together with the still not amplified output signal of CVG 3 in order to eliminate or substantially reduce interference signal QUAD.

Figure 2:
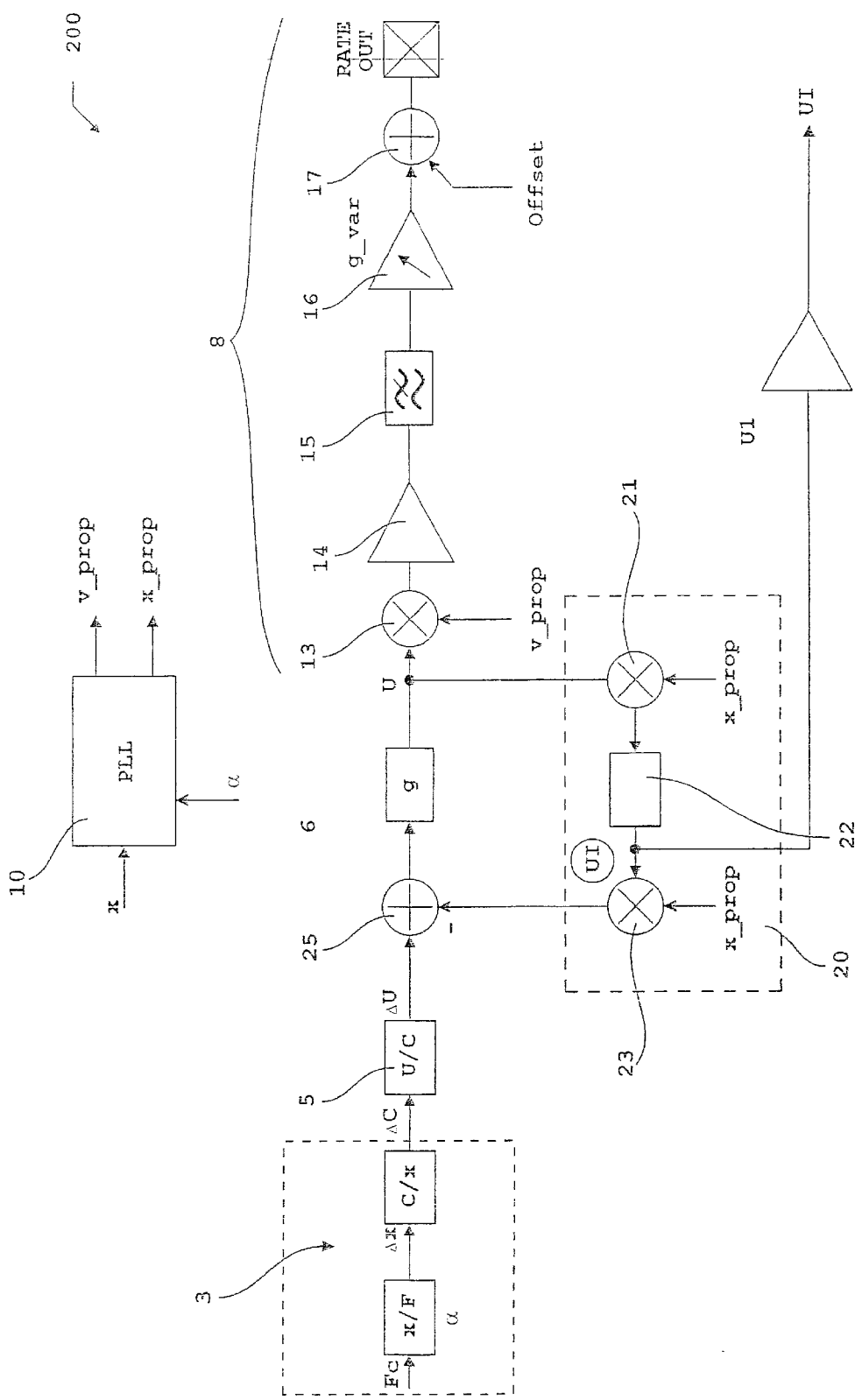
FIG. 2 shows a known extension of the analyzing circuit in FIG. 1 with a quadrature control loop to suppress strong interference.

The balancing method described above with reference to FIG. 1 fails in a device according to FIG. 2 since quadrature control loop 20 suppresses the quadrature demodulated by the yaw rate signal at the output if the yaw rate signal of sensor 3 is applied and PLL 10 is incorrectly balanced. This means that the criterion for balancing phase angle $\alpha$ of PLL 10 is lacking. Rather, a signal at an output of controller 22 is now used as a balancing criterion in this case. At the output of controller 22, very small V/°($\alpha$) signals are produced, which are made even smaller with a large capture range of controller 22. It is not possible to avoid these problems by amplifying signal UI at the output of controller 22 since the supply voltage available is usually limited to 5V, for example, and the signal for suppressing the quadrature is often substantially greater than the signal resulting through the effect of an external yaw rate. Amplified signal UI would therefore reach the limits of the possible modulation range.

Some processing steps are explained below in the form of equations to illustrate the problems occurring and the positive effect of a method and a device according to the present invention:

Provided that v=constant and no path-proportional interference signals (quadrature Q) are present, the following is true:

$$U=\text{const.}1*\cos(w0*t-\alpha)*\Omega*\cos(wN*t) \quad (1)$$

$$U=1/2*\text{const.}1*\Omega*[\cos((w0-wN)*t-\alpha)+\cos((w0+wN)*t-\alpha)]$$

where:

U: amplitude modulated yaw rate-proportional signal
const.1: constant 1
w0: sensor drive resonance frequency
$\alpha$: phase shift of detection mode of sensor element
$\Omega$: external yaw rate
wN: useful frequency or yaw rate
t: time variable If during the synchronous demodulation with rectangular signal v_prop, it is disregarded that the odd-numbered multiples also deliver components, then if $$v\_\text{prop}=\cos(w0*t-\alpha)$$

where:

v_prop: velocity-proportional demodulation signal $$\text{RATE OUT}=g\text{var}*\text{const.}1*1/2*\Omega*\cos(wN*t)$$

where:

RATE OUT: output signal at the yaw rate sensor
is obtained as an output signal after low-pass filtering with suppression of the double frequency:

Using g_var, it is possible to balance the desired sensitivity of entire combination 300 in amplifier 16.

If quadrature signals Q are present, under the assumption that the quadrature is also phase-shifted by $\alpha$, then (1) is modified to:

$$U=\text{const.}1*\cos(w0*t-\alpha)*\Omega*\cos(wN*t)+\text{const.}2*Q*\sin(w0*t-\alpha) \quad (3)$$

where:

Gvar: variable gain for sensitivity balancing
Q: amplitude of the quadrature signals QUAD
const.2: constant 2

If demodulation signal v_prop were not now shifted by a, the following would result:

$$\text{RATE OUT}=g\text{var}*\text{const.}1*1/2*Q*\cos(wN*t)*\cos\alpha+ g\text{var}*\text{const.}2*1/2*Q*\sin\alpha \quad (4)$$

It is apparent from equations (3) and (4) that the quadrature signal QUAD component is small compared to the useful signal for two reasons:
1. The signal processing is able to process the quadrature signal in a linear manner until the synchronous demodulation.
2. If there is an incorrect demodulation with angle α, an offset is produced at the output:

$$\text{RATE OUT}=gvar*const.2*1/2*Q*\sin\alpha$$

Therefore, a quadrature control loop 20 is provided in the system which path (quadrature) demodulates amplitude-modulated signal U by multiplication with x_prop, FIG. 2. This signal is supplied via a controller 22 which is an I-controller and integrates the signal. After a repeated modulation with x_prop, output signal UI is "held against" the quadrature signal coming from sensor element 3 at summer 25. Summer 25 reduces the quadrature component of voltage U to zero except for a very small, residual deviation.

Figure 4:
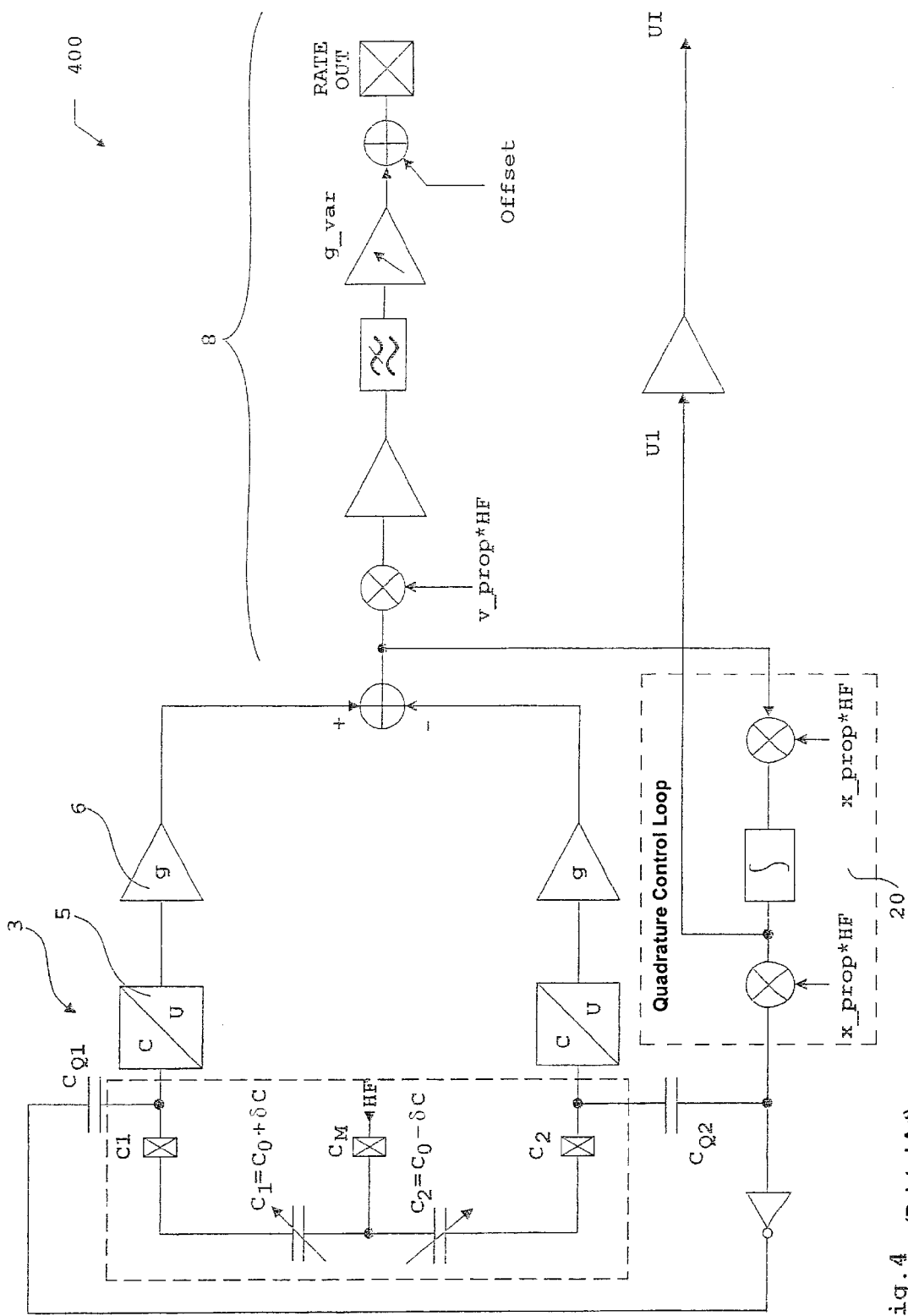
FIG. 4 shows the known yaw rate sensor in detail and the known analyzing circuit according to FIG. 2.

FIG. 4 shows the known yaw rate sensor in greater detail and the known analyzing circuit according to FIG. 2. For the sake of clarity, only the reference symbols of the major function blocks and connecting elements have been entered, e.g., CVG 3, analyzing device 8, quadrature control loop 20, etc.

The capture range of quadrature control loop 20 results in:

$$\Delta UI=\Delta UIN=U_{HF}*\delta C/CQ1,2$$

where:
$U_{HF}$: amplitude of the measuring voltage at carrier frequency
ΔUI: change of the I-controller output voltage
ΔUIN: modulator input voltage i.e., at a given maximum ΔUI (e.g., specified by the maximum range of the modulation of the operational amplifier), the maximum allowable $\delta C_{Quad}$ is:

$$\delta C_{Quad}=CQ1,2*\Delta UI/U_{HF}$$

where:
$\delta C_{Quad}$: change in capacitance due to quadrature
CQ1,2 coupling capacitance of the quadrature control loop $\delta C_{Quad}$ and ΔUI are understood to be the amplitudes of the corresponding sinusoidal oscillations. From (5), it is apparent that the quadrature controller capture range may also be expanded by enlarging CQ1,2, and a minimum CQ1,2 is used for a capture range.

If PLL 10 has been incorrectly balanced by angle a and if a constant external yaw rate proportional to cos(w0*t) is applied for the balancing, then the amplitude of the controller output is adjusted so that the controller receives no input signal.

The following trigonometric equation applies:

$$\delta C*\cos(w0*t-\alpha)=\delta C*[\cos(w0*t)*\cos\alpha+\sin(w0*t)*\sin\alpha]$$

The first term in the square brackets is the yaw rate which remains nearly uninfluenced (for α <1°) by the quadrature control loop. The second term is in phase with the quadrature and is therefore detected and suppressed by the quadrature control loop.

The following applies to the steady-state condition:

$$\delta C*\sin(w0*t)*\sin\alpha=CQ1,2*\Delta UI/U_{HF}*\sin(w0*t) \text{ or}$$

$$\Delta UI=U_{HF}*\delta C/CQ1,2+\sin\alpha \tag{6}$$

Numerical example:
If $U_{HF}$=0.8V, CQ1,2=0.75 pF, δC=2.5 fF at 100°/s and α=1°, ΔUI=47 μV/°, i.e., in the arrangements shown in FIG. 2 and FIG. 4, a very high voltage change of 47 μV/° at an external yaw rate of 100°/s is measurable at the controller output.

Balancing is carried out in the devices of FIGS. 2 and 4 according to the related art in such a way that with an applied constant yaw rate, all balancing bits of the PLL balancing are selected and the output signal of controller 22 is recorded. The same procedure is repeated with an opposite sign at the same yaw rate. The point of intersection of both characteristics denotes the correct balancing combination. However, small balancing values are difficult to detect during production. The problem may be corrected by using an additional amplifier. However, this has the disadvantage that quadrature signal QUAD present at the controller output in any case, which may be much larger than the balancing signal, is also amplified.

Figure 3A:
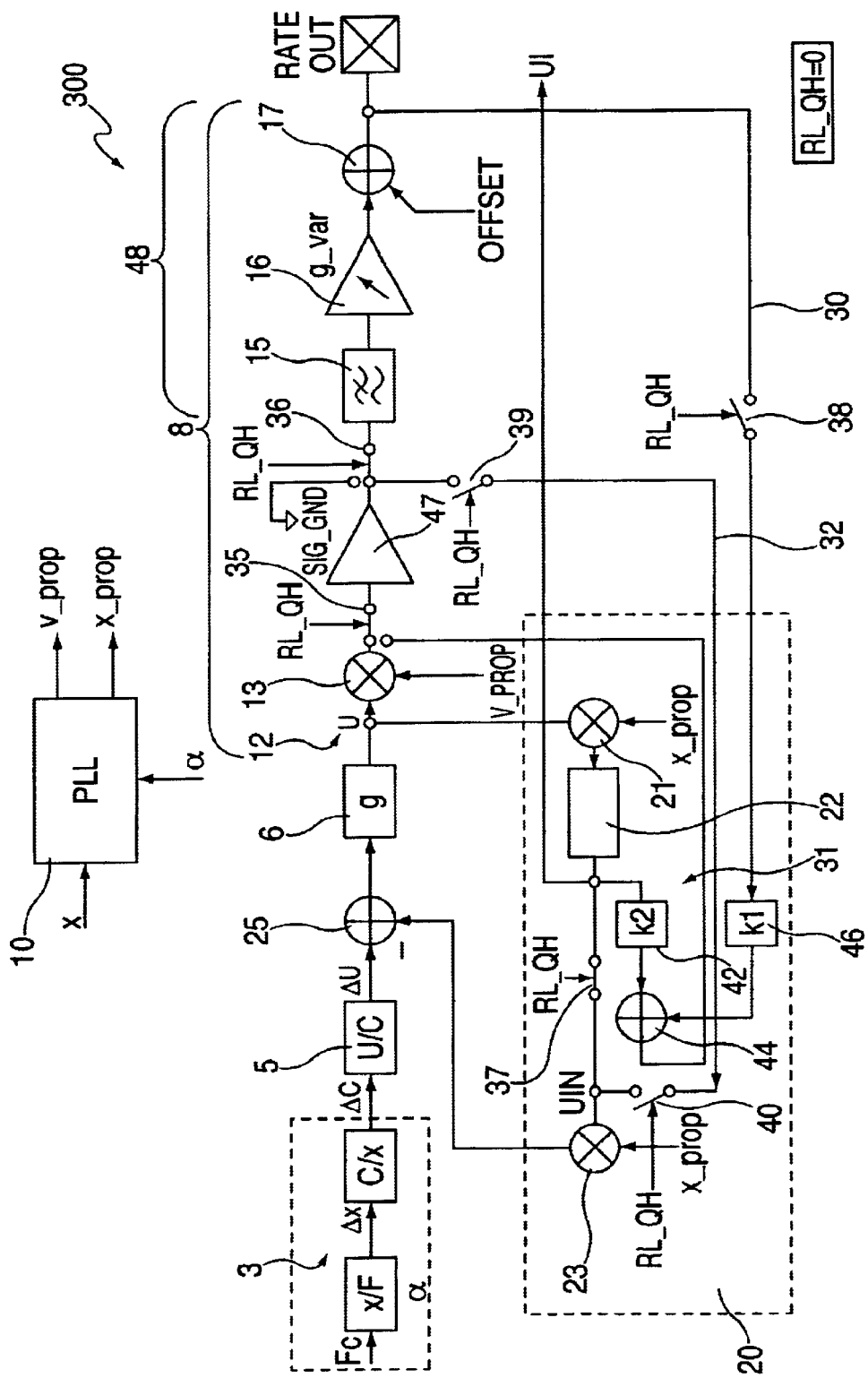
FIG. 3a shows an analyzing circuit according to the present invention for the known yaw rate sensor, which is shown in a highly schematic form, the switch positions of the switches according to the present invention for normal controller operation being shown.
Figure 3B:
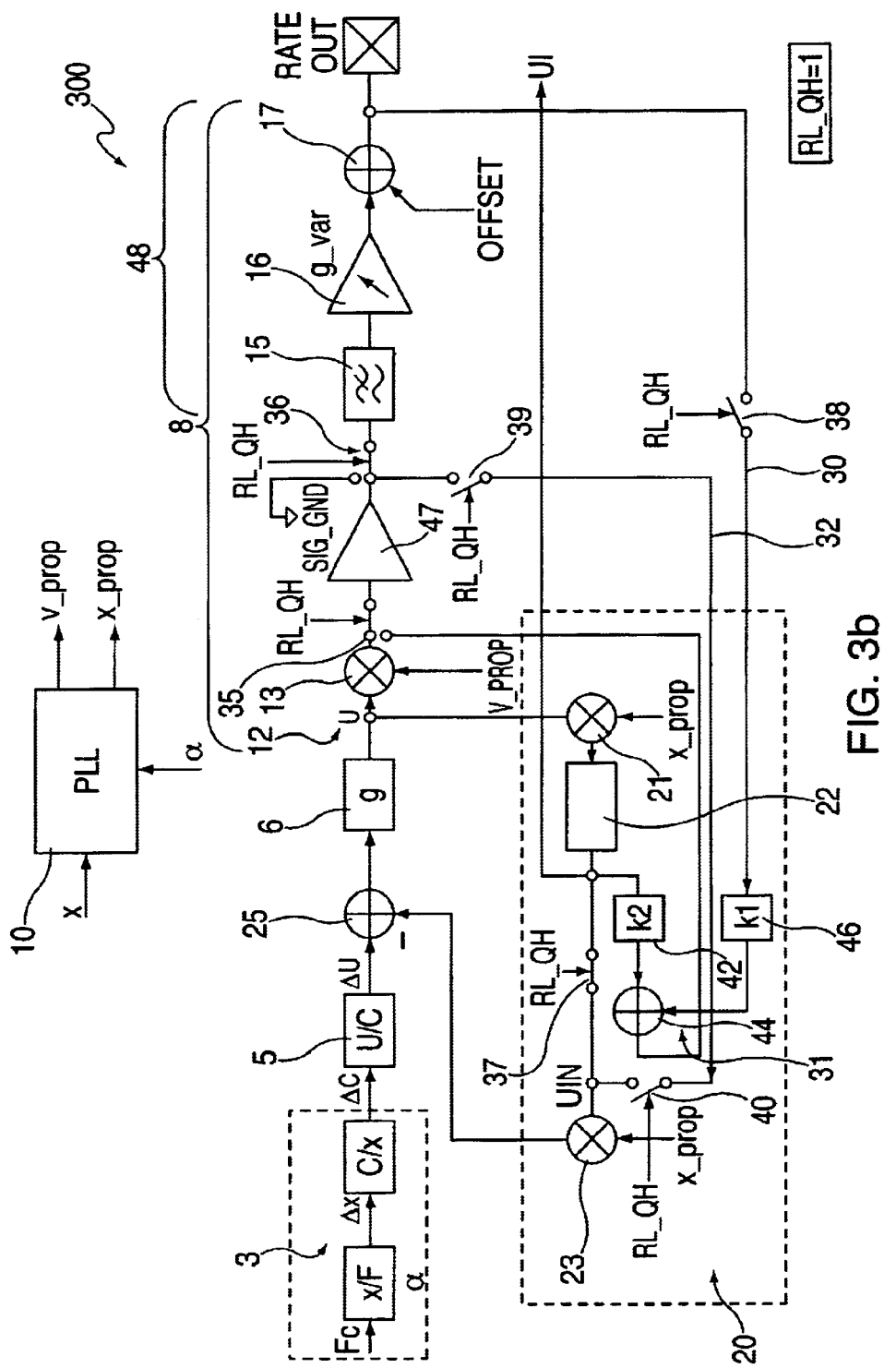
FIG. 3b shows the analyzing circuit according to the present invention of FIG. 3a, the switch positions of the switches according to the present invention for the balancing condition being shown.

A device according to the present invention to solve this problem is shown in FIG. 3a. Compared to the circuit in FIG. 2, three branches 30, 31, 32 have been added to the circuit in FIG. 3a for improved balancing. According to the method described below, the extended circuit of analyzing device 8 is added via switches 35, 36 in signal path 12, a switch 37 in quadrature control loop 20, and one switch 38, 39 each in feedback branch 30 and connecting branch 32. It is possible to change the switch position of switches marked 35, 36, 37, 38, 39 by a logical "1" via a FLAG RL_QH which may be activated by software during balancing. As a result, attenuating branch or tuning branch 31 is connected between the output of controller 22 and the input of the amplifier or impedance transformer 47. Attenuating branch 31 has an attenuating element 42 which has an attenuation factor K2, a summer 44, a coupling element 46 which supplies the output signal weighted with a factor K1 to summer 44 via feedback branch 30, and an impedance transformer 47 which is connected between the output of summer 44 and the input of mixer 23. The input of coupling element 46 is connected with RATE OUT; a separate input for this purpose may also be provided in an alterative embodiment. The switch positions in FIG. 3a are drawn as they apply for RL_QH=0, i.e., the switch position in normal control operation. FIG. 3b also shows the switch positions for RL_QH=1, i.e., the balancing state.

According to the present invention, the following method is preferred for the quadrature adjustment of PLL 10 and analyzing device 8:
1. First, voltage UI is measured and read out at the output of quadrature controller 22 for the switch positions corresponding to RL_QH=0 without the effect of an external yaw rate. In this way, voltage $UI_{Quad}$ is determined for yaw rate sensor 3 to be balanced, this voltage being used to clear the existing quadrature of sensor device 3.
2. By setting RL_QH=1 and the corresponding switch positions, this voltage $UI_{Qaud}$ is applied to coupling element K1 via the offset balancing, which is present in any case with RATE OUT. Signal path 12 is simultaneously connected to the signal ground or frame via switch 36 in order only to have the effect of the offset balancing at the signal output. Signal UI at the output of controller 22 is set to the signal ground or frame, i.e., nothing additional is fed in since the voltage used to suppress the quadrature is already made available via coupling element K1.
3. If an external yaw rate is now applied, the controller output voltage thus changes according to:

$$\Delta UI=1/K2*U_{HF}*\delta C/CQ1,2*\sin\alpha \tag{7}$$

where:
ΔUI: change of the controller output voltage
K2: attenuation factor
$U_{HF}$: amplitude of the measuring voltage at carrier frequency
δC change in capacitance of the measuring capacitors in the sensor element
CQ1,2: coupling capacitances of the quadrature control loop
α: phase shift of detection mode of sensor element Since K2<<1 may be selected, it is possible to significantly increase the balancing sensitivity. The correct balancing combination is now determined again as was described above referring to the related art according to FIG. 2. CQ1,2 may not fall below a minimum value derived from the quadrature capture range; therefore, the balancing sensitivity may also increased via 1/K2>>1 with given $U_{HF}$ and δC.

4. After balancing, RL_QH=0 is set by the software and the switches assume the position shown in FIG. 3a.

The adjustment of the balancing sensitivity is thus decoupled from the quadrature capture range and is carried out with substantially improved precision. To complete the method, which may be implemented fully automatically, for example by suitable software, the normal control operation is adjusted in the tuned control device.

Figure 5:
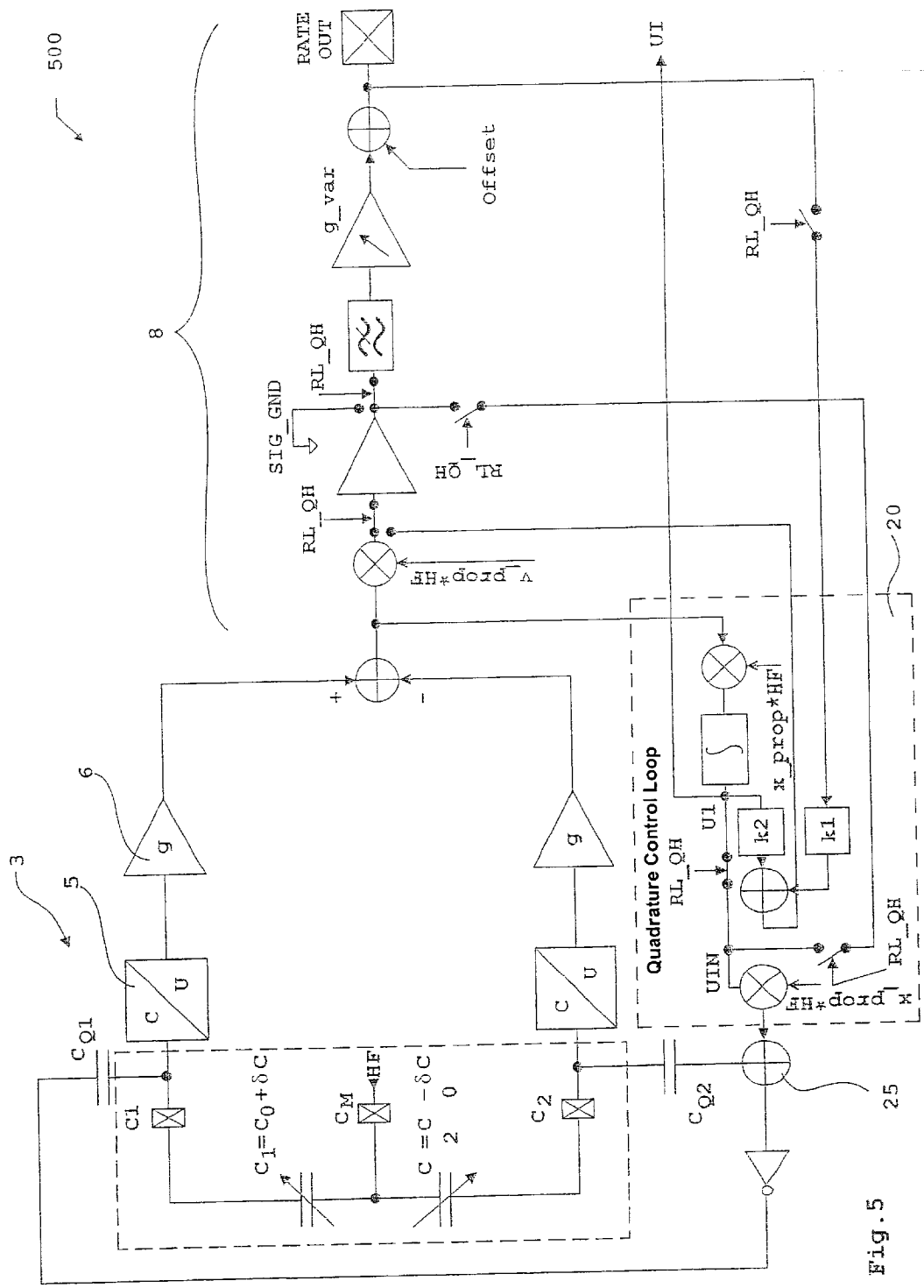

FIG. 4 shows a combination 400 of known yaw rate sensor 3, which is shown in greater detail compared to FIG. 1, and known analyzing circuit 8 according to FIG. 2. FIG. 5 shows a combination 500 of known yaw rate sensor 3, which is shown in greater detail compared to FIG. 1, and the analyzing device/analyzing circuit of the present invention according to FIG. 3a. For the sake of clarity, only the reference symbols of the major function blocks of FIGS. 2 and 3a are indicated in FIGS. 4 and 5. For the implementation of the method of the present invention, it is inconsequential that as a result of the effect of the external yaw rate on the oscillating mass of the sensor, a high frequency voltage $U_{HF}$ is used to analyze the capacitance change of the capacitors $C1=C_0+\Box C$ and $C2=C_0-\Box C$ of yaw rate sensor 3, as is indicated in FIGS. 4 and 5.

In a refinement of the present invention, the quadrature voltage is applied to coupling unit K1 externally via a separate pin or terminal (not shown).

What is claimed is:

1. A method of balancing a phase-locked loop of an electronic analyzing device that analyzes an output signal of a sensor device representing a yaw rate signal, the electronic analyzing device including an oscillating mass that undergoes a deflection under an effect of an external yaw rate on the sensor device and the output signal, the electronic analyzing device including a control loop provided with a controller having an input and an output, the control loop being further provided with one of a modulator and mixer having an input provided with a first electrical connection to the output of the controller, the method comprising:
   interrupting the first electrical connection between the output of the controller and the input of the one of the modulator and the mixer; and
   producing a second electrical connection between the output of the controller and the input of the one of the modulator and the mixer, an attenuating element being connected in between in the second electrical connection.

2. The method according to claim 1, wherein:
the sensor device includes a yaw rate sensor operating in accordance with the Coriolis effect.

3. The method according to claim 1, wherein:
the control loop includes a quadrature control loop.

4. The method according to claim 1, further comprising:
selecting an attenuation factor of the attenuating element to be less than 1, whereby a balancing sensitivity of the output of the controller is substantially increased compared to when the attenuation factor equals 1.

5. The method according to claim 1, wherein:
the second electrical connection is made by connecting a summer in between.

6. The method according to claim 1, wherein:
for balancing the phase-locked loop, the first electrical connection is produced in a first step and an output voltage of the controller is determined without an effect of the external yaw rate on the sensor device.

7. The method according to claim 6, wherein:
for the balancing of the phase-locked loop, the second electrical connection is produced in a second step.

8. The method according to claim 7, wherein:
the electronic analyzing device includes an output stage and is connected to signal ground during the second step.

9. The method according to claim 8, further comprising:
adjusting a voltage level of the output of the controller to a voltage level of the signal-ground during the second step; and
supplying a voltage to a summer of the control loop via a summer of the output stage, wherein:
   the voltage supplied to the summer of the control loop is proportional to the voltage level of the output of the controller determined in the first step.

10. The method according to claim 9, wherein:
the external yaw rate acts on the sensor device in a third step.

11. The method according to claim 3, wherein:
the following applies to an output voltage of the controller under the effect of the external yaw rate:

$$UI=1/K2*UHF*C/CQ1,2*\sin$$

where:
UI: change in the controller output voltage,
K2: attenuation factor,
UHF: amplitude of a measuring voltage at a carrier frequency,
C change in capacitance of measuring capacitors in a sensor element,
CQ1,2: coupling capacitances of the quadrature control loop, and
: phase shift of detection mode of the sensor element.

12. An electronic analyzing device for measuring an output signal of a sensor device representing a yaw rate signal, comprising:
an oscillating mass that undergoes a deflection under an effect of an external yaw rate on the sensor device and the output signal;
a phase-locked loop; and
a control loop provided with:
   a controller having an input and an output,
   one of a modulator and a mixer having an input,
   an attenuating element, and
   at least one of a summer and a coupling element.

13. The electronic analyzing device according to claim 12, wherein:
the sensor device includes a yaw rate sensor operating in accordance with the Coriolis effect.

14. The electronic analyzing device according to claim 12, wherein:
the control loop includes a quadrature loop.

* * * * *

UNITED STATES PATENT AND TRADEMARK OFFICE
CERTIFICATE OF CORRECTION

PATENT NO. : 6,672,159 B2
DATED : January 6, 2004
INVENTOR(S) : Frank Schmid et al.

It is certified that error appears in the above-identified patent and that said Letters Patent is hereby corrected as shown below:

Column 2,
Line 4, change "(see FIG. 2; FIG. 4)" to -- (see FIG. 2, FIG. 4) --;
Line 32, change "angle a" to -- angle $\alpha$ --;

Column 4,
Line 63, change "shifted by a," to -- shifted by $\alpha$ --; and

Column 5,
Line 50, change "by angle a" to -- by angle $\alpha$ --.

Signed and Sealed this

Twenty-sixth Day of October, 2004

JON W. DUDAS
*Director of the United States Patent and Trademark Office*